(12) United States Patent
Kochi et al.

(10) Patent No.: US 12,148,240 B2
(45) Date of Patent: Nov. 19, 2024

(54) FACE AUTHENTICATION APPARATUS

(71) Applicant: NEC Corporation, Tokyo (JP)

(72) Inventors: Taketo Kochi, Tokyo (JP); Kenji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 221 days.

(21) Appl. No.: 17/848,594

(22) Filed: Jun. 24, 2022

(65) Prior Publication Data

US 2022/0319228 A1 Oct. 6, 2022

Related U.S. Application Data

(63) Continuation of application No. 16/961,310, filed as application No. PCT/JP2018/047063 on Dec. 20, 2018, now Pat. No. 11,403,873.

(30) Foreign Application Priority Data

Jan. 12, 2018 (JP) ................. 2018-003229

(51) Int. Cl.
*G06V 40/16* (2022.01)
*G06T 1/00* (2006.01)
*G06T 7/00* (2017.01)

(52) U.S. Cl.
CPC .......... *G06V 40/165* (2022.01); *G06T 7/0014* (2013.01); *G06T 1/0007* (2013.01); *G06T 2207/30201* (2013.01)

(58) Field of Classification Search
None
See application file for complete search history.

(56) References Cited

U.S. PATENT DOCUMENTS

| 6,081,606 A | 6/2000 | Hansen | G06T 7/248 348/E5.066 |
| 7,505,613 B2 * | 3/2009 | Russo | G06V 40/1388 382/125 |
| 9,936,442 B1 | 4/2018 | Noonan | B01J 35/0046 |

(Continued)

FOREIGN PATENT DOCUMENTS

| CN | 112990622 A | 6/2021 | ......... G06K 9/00255 |
| EP | 2558977 A1 | 2/2013 | |

(Continued)

OTHER PUBLICATIONS

Notice of Reasons for Refusal for corresponding JP 2018-003229, dated Feb. 12, 2019.

(Continued)

*Primary Examiner* — Michelle M Entezari Hausmann
(74) *Attorney, Agent, or Firm* — Sughrue Mion, PLLC

(57) ABSTRACT

A face authentication apparatus includes a face image acquisition unit that acquires, as a first face image, a face image of a user who moves from a first area to a second area via a gate provided between the first area and the second area, a collation unit that performs face authentication, a flow rate measurement unit that measures a flow rate of users who move from the first area to the second area via the gate and a flow rate of users who move from the second area to the first area via the gate, and a security level determination unit that determines the security level of the first area and the security level of the second area on the basis of the flow rates measured.

8 Claims, 8 Drawing Sheets

(56) References Cited

U.S. PATENT DOCUMENTS

| | | | | |
|---|---|---|---|---|
| 2003/0140233 A1* | 7/2003 | Samar | G07C 9/257 | 713/186 |
| 2004/0064453 A1 | 4/2004 | Ruiz | G06F 21/32 | |
| 2004/0161133 A1 | 8/2004 | Elazar | G08B 13/19615 | 382/115 |
| 2007/0122011 A1* | 5/2007 | Takizawa | G07C 9/10 | 382/118 |
| 2007/0273514 A1 | 11/2007 | Winand | G07C 9/28 | 340/568.1 |
| 2008/0192122 A1* | 8/2008 | Izawa | G06V 40/165 | 348/E7.001 |
| 2009/0189984 A1 | 7/2009 | Yamazaki | | |
| 2010/0045424 A1 | 2/2010 | Kawakita | | |
| 2010/0245041 A1* | 9/2010 | Aoki | G07C 9/10 | 340/5.82 |
| 2010/0265034 A1 | 10/2010 | Cap | H01Q 1/3241 | 340/6.71 |
| 2012/0086550 A1 | 4/2012 | LeBlanc | A61B 5/6807 | 340/5.82 |
| 2012/0159582 A1* | 6/2012 | Griffin | G06F 21/36 | 726/5 |
| 2014/0211036 A1* | 7/2014 | Aoki | H04N 23/81 | 348/222.1 |
| 2015/0324559 A1* | 11/2015 | Boss | G06Q 50/01 | 726/1 |
| 2015/0347734 A1* | 12/2015 | Beigi | H04L 9/3268 | 726/28 |
| 2016/0063235 A1* | 3/2016 | Tussy | G06V 40/67 | 726/6 |
| 2016/0284142 A1* | 9/2016 | Elbling | E06B 11/08 | |
| 2017/0228953 A1 | 8/2017 | Lupovici | G07C 9/00896 | |
| 2018/0130074 A1* | 5/2018 | Hu | H04W 4/33 | |
| 2018/0278894 A1 | 9/2018 | Kanga | G06V 10/26 | |
| 2018/0357869 A1* | 12/2018 | Figov | G06V 20/52 | |
| 2020/0211309 A1 | 7/2020 | Daniel | G07C 9/00 | |

FOREIGN PATENT DOCUMENTS

| | | |
|---|---|---|
| EP | 2704107 A2 | 3/2014 |
| JP | 2007-166541 A | 6/2007 |
| JP | 2009-3659 A | 1/2009 |
| JP | 2008-108555 A | 5/2009 |
| JP | 2010-003009 A | 1/2010 |
| TW | I642020 B | 11/2018 |

OTHER PUBLICATIONS

Notice of Reasons for Refusal for corresponding JP 2018-003229, dated Jul. 23, 2019.

Decision to Grant a Patent for corresponding JP 2018-003229, dated Nov. 5, 2019.

International Search Report for PCT/JP2018/047063, dated Feb. 19, 2019.

Extended European Search Report for EP Application No. EP18899922.1 dated on Feb. 10, 2021.

TW I642020 B Machine Translation (Year: 2018).

CN 112990622 A [machine translation] (Year: 2021).

\* cited by examiner

If there is a significant difference between the flow rate X and the flow rate Y in a time period from 6:00 to 9:00 (condition section), the security level of an area located downstream of the area having a higher flow rate in the time period is set to "high", and the security level of an area located upstream thereof is set to "low" (conclusion section).

126b

If there is a significant difference between the flow rate X and the flow rate Y in a time period from 17:00 to 20:00 (condition section), the security level of an area located upstream of the area having a higher flow rate in the time period is set to "high", and the security level of an area located downstream thereof is set to "low" (conclusion section).

FACE AUTHENTICATION APPARATUS

CROSS-REFERENCE TO RELATED APPLICATIONS

The present application is a continuation application of U.S. patent application Ser. No. 16/961,310 filed on Jul. 10, 2020, which is a National Stage Entry of international application PCT/JP2018/047063 filed on Dec. 20, 2018, which claims the benefit of priority from Japanese Patent Application No. 2018-003229 filed on Jan. 12, 2018, the disclosures of all of which are incorporated in their entirety by reference herein.

TECHNICAL FIELD

The present invention relates to a face authentication apparatus, a face authentication method, and a recording medium.

BACKGROUND ART

Conventionally, in various systems such as an access monitoring system and an attendance management system, personal authentication by means of face authentication is performed on a user who passes through a gate or the like.

For example, Patent Literatures 1 and 2 each disclose a face authentication apparatus that performs face authentication by acquiring a face image of a person who passes through a gate provided at an entrance of a collective housing or an office building, calculating similarity between the face image and a reference face image of a previously registered person, and comparing it with a threshold.

Further, in the face authentication apparatus of this type, a configuration of automatically changing a threshold to be used for collation is employed.

For example, in Patent Literature 1, a threshold to be used for collation of a person who passes through a gate is automatically changed based on a previously set reference time such as an average time to go home and the current time. In Patent Literature 2, the number of persons who pass through a gate is measured, and when the number of persons is large, a small threshold is set.

Patent Literature 1: JP 2009-3659 A
Patent Literature 2: JP 2007-156541 A

SUMMARY

In a system for face authentication of a user who passes through a gate, generally, an administrator determines the security levels of both sides of the gate and sets a threshold for face authentication on the basis of the determination result. Specifically, like an entry gate of an office building or an event site, in the case of performing face authentication on users who enter the inside having a high security level from the outside having a low security level, a collation threshold is set to be relatively larger so as to lower the false acceptance rate to place emphasis on security. On the other hand, like an exit gate of an office building or an event site, in the case of performing face authentication on users who go out from the inside having a high security level to the outside having a low security level, a collation threshold is set to be relatively smaller so as to lower the false rejection rate to place emphasis on convenience. However, if the security levels of both sides of a gate are determined manually, a burden on the administrator increases.

An exemplary object of the present invention is to provide a face authentication apparatus that solves the aforementioned problem.

A face authentication apparatus according to one aspect of the present invention includes
 a face image acquisition unit that acquires, as a first face image, a face image of a user who moves from a first area to a second area via a gate provided between the first area and the second area,
 a collation unit that performs face authentication on the first face image,
 a flow rate measurement unit that measures a flow rate of users who move from the first area to the second area via the gate and a flow rate of users who move from the second area to the first area via the gate, and
 a security level determination unit that determines a security level of the first area and a security level of the second area on the basis of the flow rates measured.

A face authentication method according to another aspect of the present invention includes
 acquiring, as a first face image, a face image of a user who moves from a first area to a second area via a gate provided between the first area and the second area,
 performing face authentication on the first face image,
 measuring a flow rate of users who move from the first area to the second area via the gate and a flow rate of users who move from the second area to the first area via the gate, and
 determining a security level of the first area and a security level of the second area on the basis of the flow rates measured.

A computer-readable medium according to another aspect of the present invention is a medium storing a program for causing a computer to function as:
 a face image acquisition unit that acquires, as a first face image, a face image of a user who moves from a first area to a second area via a gate provided between the first area and the second area,
 a collation unit that performs face authentication on the first face image,
 a flow rate measurement unit that measures a flow rate of users who move from the first area to the second area via the gate and a flow rate of users who move from the second area to the first area via the gate, and
 a security level determination unit that determines a security level of the first area and a security level of the second area on the basis of the flow rates measured.

With the configurations described above, the present invention enables determination of security levels on both sides of the gate and enables significant reduction of a burden on the administrator.

BRIEF DESCRIPTION OF DRAWINGS

FIG. 3 illustrates examples of security level determination rules used in the first exemplary embodiment of the present invention.

EXEMPLARY EMBODIMENTS

Next, exemplary embodiments of the present invention will be described in detail with reference to the drawings.

First Exemplary Embodiment

Figure 1:
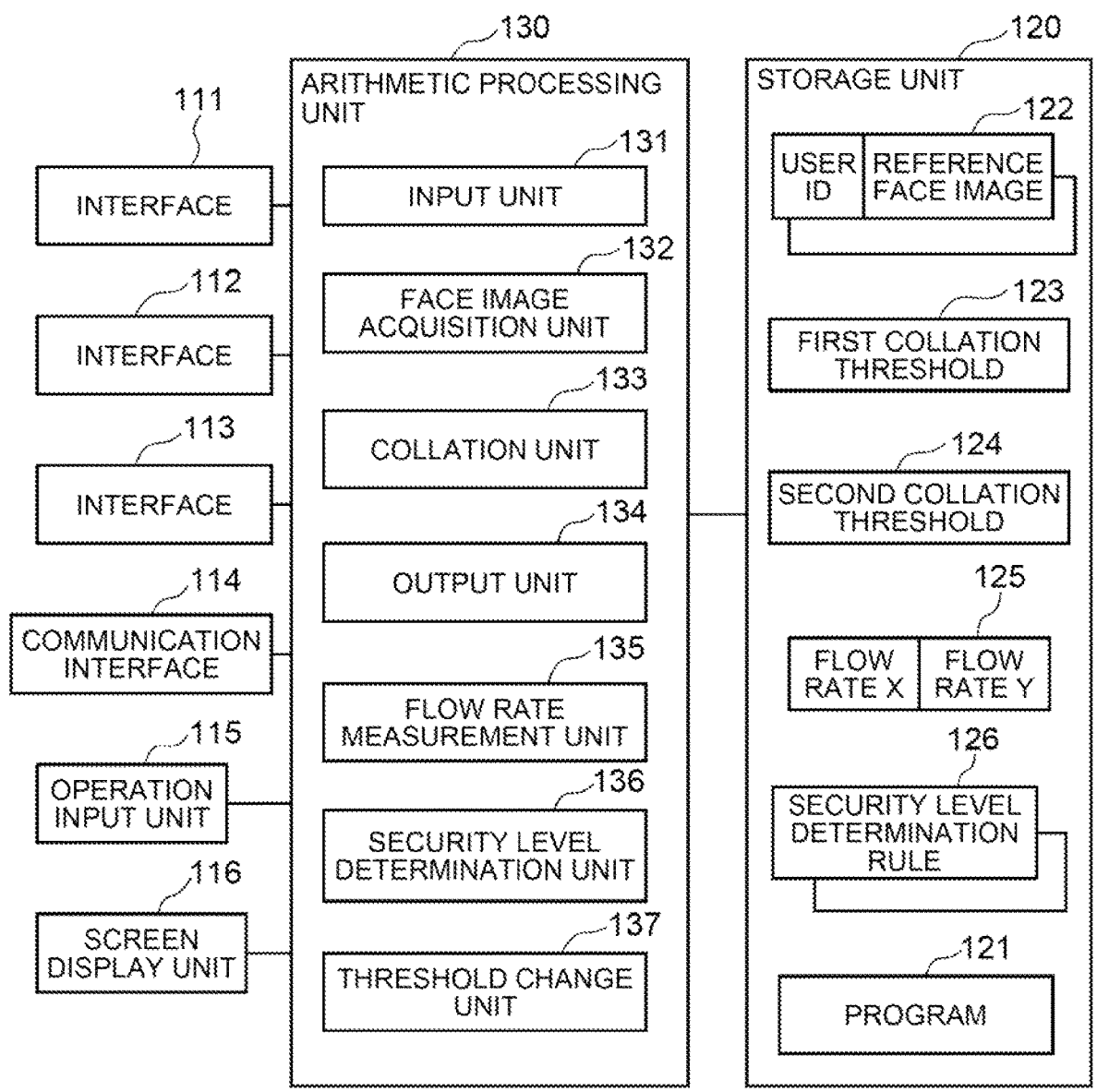
FIG. 1 is a block diagram of a face authentication apparatus according to a first exemplary embodiment of the present invention.
Figure 2:
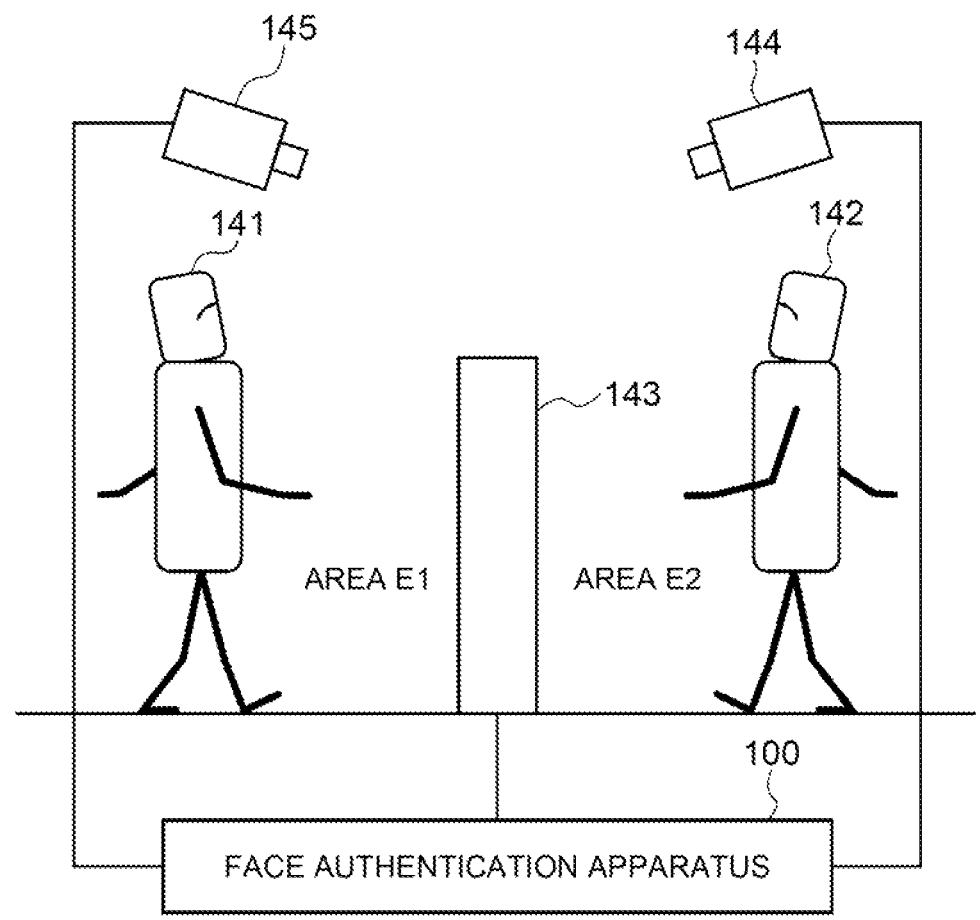
FIG. 2 illustrates the outline of an access management system including the face authentication apparatus according to the first exemplary embodiment of the present invention.

FIG. 1 is a block diagram of a face authentication apparatus 100 according to a first exemplary embodiment of the present invention. FIG. 2 is a schematic diagram of an access management system including the face authentication apparatus 100 according to the first exemplary embodiment of the present invention. Referring to FIG. 1, the face authentication apparatus 100 includes an interface 111 with a gate apparatus 143, an interface 112 with a camera unit 144, an interface 113 with a camera unit 145, a communication interface 114, an operation input unit 115, a screen display unit 116, a storage unit 120, and an arithmetic processing unit 130. The face authentication apparatus 100 of the present embodiment is configured to perform face authentication on a user 141 who passes through the gate apparatus 143, provided between an area E1 and an area E2, form the area E1 to the area F2, and a user 142 who passes through in an opposite direction from the area E2 to the area E1, and transmit the authentication results to the gate apparatus 143.

The interface 111 is configured to transmit and receive signals such as results of face authentication to and from the gate apparatus 143. Transmission and reception of signals may be performed in a wired or wireless manner.

The gate apparatus 143 is a gate for both entry and exit, provided between the area E1 and the area E2. The face authentication apparatus 100 is configured to perform face authentication on the user 141 who passes through the gate apparatus 143 form the area E1 to the area F2, and the user 142 who passes through in the opposite direction from the area E2 to the area E1, and transmit the authentication results to the gate apparatus 143. The gate apparatus 143 performs predetermined operation according to a received result of the face authentication. Predetermined operation may include various types of operation. For example, the gate apparatus 143 automatically performs open/close operation of a gate provided to the gate apparatus 143 according to the result of face authentication. The gate apparatus 143 may include a gate bar that is manually openable/closable, and unlock the gate bar for a certain period only when face authentication has succeeded. The gate 143 may output a message of passage propriety visually or by sound from an alarm provided to the gate apparatus 143 according to the result of face authentication. The gate apparatus 143 may be a stationary type, or a portable type that can be moved. The gate apparatus 143 may be an apparatus independent of the face authentication apparatus 100, or an apparatus integrated with the face authentication apparatus 100.

The interface 112 with the camera unit 144 is configured to transmit and receive signals to and from the camera unit 144. The interface 113 with the camera unit 145 is configured to transmit and receive signals to and from the camera unit 145. Transmission and reception of signals may be performed in a wired or wireless manner.

As illustrated in FIG. 2, the camera unit 144 is set at a position with an image angle where the camera unit 144 can image a face portion of the user 141 who moves from the area E1 to the area E2 via the gate apparatus 143. As illustrated in FIG. 2, the camera unit 145 is set at a position with an image angle where the camera unit 145 can image a face portion of the user 142 who moves from the area E2 to the area E1 via the gate apparatus 143. Each of the camera units 144 and 145 is an imaging device configured of a Charge Coupled Device (CCD), a Complementary Metal Oxide Semiconductor (CMOS) sensor, or the like that outputs image data captured by imaging a face portion of a person who is an authentication target. The image data captured by the camera units 144 and 145 is, for example, a black-and-white gradation image of 256 gradations but may be a color image. While two camera units 144 and 145 are used in FIG. 2, it is possible to use one wide-angle camera unit for example, so as to capture face images of both users 141 and 142 passing through the gate apparatus 143 in directions opposite to each other.

The communication interface 114 is a communication device that performs data communication with an external device such as a terminal. The communication system may be wired or wireless communication.

The operation input unit 115 includes an input device such as a keyboard and numeric keys, and is configured to detect an operation by an operator and output it to the arithmetic processing unit 130.

The screen display unit 116 is a screen display device such as a liquid crystal display (LCD) or a plasma display panel (PDP). The screen display unit 116 is configured to display various types of information such as an operation menu on a screen according to an instruction from the arithmetic processing unit 130.

The storage unit 120 is a storage device such as a hard disk or a memory. The storage unit 120 is configured to store processing information and a program 121 necessary for various types of processing to be performed in the arithmetic processing unit 130.

The program 121 implements various processing units by being read into the arithmetic processing unit 130 and executed. The program 121 is read, in advance, from an external device (not illustrated) or a storage medium (note illustrated) via a data input/output function such as the communication interface 114, and is stored in the storage unit 120.

Main processing information stored in the storage unit 120 includes reference face image data 122, a first collation threshold 123, a second collation threshold 124, flow rate data 125, and a security level determination rule 126.

The reference face image data 122 is data in which a face image, serving as a reference to be used when face authentication is performed, and a user ID are associated with each other. In the reference face image data 122, at least one face image of a person having a user ID can be associated with the user ID as a reference face image. Alternatively, in the reference face image data 122, the feature amount of the face extracted from a face image of a person having a user ID may be associated with the user ID as reference face information. Here, the feature amount of a face is a numerical value representing a feature of each part in a face image for recognizing the positional relationship or the shape of each part such as eye, nose, mouth, eyebrow, or the like constituting the face, and is used for similarity determination or the like between images.

The first collation threshold 123 is a threshold used for face authentication of the user 141 who moves from the area E1 to the area E2 via the gate apparatus 143. The second collation threshold 124 is a threshold used for face authentication of the user 142 who moves from the area E2 to the area E1 via the gate apparatus 143. In the case of the present embodiment, the first collation threshold 123 and the second collation threshold 124 are shared by every user ID. However, the present invention is applicable to the case where the first collation threshold 123 and the second collation threshold 124 are provided for each user ID.

The flow rate data 125 is measurement data of a flow rate of users passing through the gate apparatus 143. The flow rate data 125 is configured of a flow rate X and a flow rate Y. The flow rate X is data of a result of measuring a change in the flow rate per unit time of users who move from the area E1 to the area E2 via the gate apparatus 143, in a certain period (for example, one day) or more. The flow rate Y is data of a result of measuring a change in the flow rate per unit time of users who move from the area E2 to the area E1 via the gate apparatus 143, in the same period as that mentioned above. The unit of flow rate can be set arbitrarily as long as a change in the flow rate in a day can be grasped, such as persons/minute or persons/hour, for example.

The security level determination rule 126 is a rule for determining the security levels of the areas E1 and E2 on the basis of the measured flow rate. The security level determination rule 126 includes a condition section describing a condition that should be satisfied by the measured flow rate, and a conclusion section describing the security levels of the area E1 and the E2 when the condition in the condition section is satisfied. However, the security level determination rule 126 is not limited to have a rule form configured of the condition section and a conclusion section, but may have any rule form.

FIG. 3 illustrates examples of the security level determination rule 126. In the security level determination rule 126 of this example, the condition section describes as a condition that there is a significant difference between the flow rate X and the flow rate Y in a designated time period. Here, a significant difference means a difference of several-fold or more. Further, the conclusion section describes that in which one of the downstream side or the upstream side of the area having a higher flow rate in the designated time period, the security level is set higher.

Specifically, a security level determination rule 126a illustrated in FIG. 3 determines that if there is a significant difference in the flow rate in a time period from 6:00 to 9:00 between the flow rate X and the flow rate Y (condition section), the security level of an area located downstream of the area having a higher flow rate in the time period is set to "high", and the security level of an area located upstream thereof is set to "low" (conclusion section). The security level determination rule 126a is suitable for an entrance gate or an entry/exit gate provided to a main entrance of a company, a building, or the like. This is because many employees coming to work enter the main entrance or the building by passing through the gate apparatus 143 from 6:00 to 9:00, while only a small number of employees go out of the main entrance or the building.

A security level determination rule 126b illustrated in FIG. 3 determines that if there is a significant difference in the flow rate in a time period from 17:00 to 20:00 between the flow rate X and the flow rate Y (condition section), the security level of an area located upstream of the area having a higher flow rate in the time period is set to "high", and the security level of an area located downstream thereof is set to "low" (conclusion section). The security level determination rule 126b is suitable for an exit-only gate or an entry/exit gate provided to a main entrance of a company, a building, or the like. This is because many employees go out of the building or the main entrance to go home by passing through the gate apparatus 143 from 17:00 to 20:00, while only a small number of employees enter the main entrance or the building.

Note that the security level determination rules 126a and 126b illustrated in FIG. 3 are mere examples, and the security level determination rule 126 is not limited to the security level determination rules 126a and 126b illustrated in FIG. 3.

Referring to FIG. 2 again, the arithmetic processing unit 130 is an arithmetic processing unit having a microprocessor such as an MPU and its peripheral circuits. The arithmetic processing unit 130 is configured to read the program 121 from the storage unit 120 and executes it to thereby allow the hardware and the program 121 to operate in cooperation with each other to implement various processing units. The processing units implemented by the arithmetic processing unit 130 includes an input unit 131, a face image acquisition unit 132, a collation unit 133, an output unit 134, a flow rate measurement unit 135, a security level determination unit 136, and a threshold change unit 137.

The input unit 131 is configured to receive the reference face image data 122, the first collation threshold 123, the second collation threshold 124, and the security level determination rule 126 input from the outside via the communication interface 144 or the operation input unit 115, and store them in the storage unit 120.

The face image acquisition unit 132 is configured to receive image data captured by imaging a face of a person who is an authentication target from the camera unit 144 via the interface 112, and acquire (detect) a face image of the authentication target from the image data as a first face image. The face image acquisition unit 132 is also configured to receive image data captured by imaging a face of a person who is an authentication target from the camera unit 145 via the interface 113, and acquire (detect) a face image of the authentication target from the image data as a second face image. The face image acquisition unit 132 performs matching between a template representing a general face contour of a person and the image data to thereby acquire a face image existing in the image data. Besides template matching, various publicly-known face detection algorithms may be used. The face image acquisition unit 132 is configured to transmit the acquired first and second face images to the collation unit 133.

The collation unit 133 is configured to calculate, for each user ID, similarity between a reference face image included in the reference face image data 122 and the first face image of the authentication target acquired by the face image acquisition unit 132, and based on the result of comparing the calculated similarity for each user ID with the first collation threshold 123, determine whether or not the first face image matches a reference face image of any user ID included in the reference face image data 122. The collation unit 133 is also configured to calculate, for each user ID, similarity between a reference face image included in the reference face image data 122 and a second face image of the authentication target acquired by the face image acquisition unit 132, and based on the result of comparing the calculated similarity for each user ID with the second collation threshold 124, determine whether or not the second face image matches a reference face image of any user ID included in the reference face image data 122. As an example of similarity, a cross-correlation coefficient between face images may be used. In that case, the similarity is high when face portions of the same person are included in the two face images, and the similarity is low when face portions of different persons are included in the two face images. As similarity between face images, besides the cross-correlation coefficient, publicly-known similarity calculation technique may be used. For example, the collation unit 133 may be configured to extract a feature amounts of faces from the first and second face images, collate the feature amount of the reference face included in the reference face image data 122 and the feature amounts of the faces extracted from the first and second face images, and calculate the similarity between the reference face image and the first and second face images.

The collation unit 133 is also configured to, when there is no reference face image, in the reference face image data 122, of a user ID in which the similarity with the first face image of the authentication target acquired by the face image acquisition unit 132 is equal to or larger than the first collation threshold 123, generate an authentication result representing collation failure and transmit the result to the output unit 134. The collation unit 133 is also configured to, when there is at least one reference face image in which the similarity with the first face image of the collation target acquired by the face image acquisition unit 132 is equal to or larger than the first collation threshold 123, generate an authentication result representing authentication success including the user ID having the maximum similarity, moving type data A, and the authentication time, and transmit the result to the output unit 134 and to the flow rate measurement unit 135. Here, the moving type data A is data indicating the moving direction of the user in which authentication has succeeded, showing a direction from the area E1 to the area E2.

The collation unit 133 is also configured to, when there is no reference face image, in the reference face image data 122, of a user ID in which the similarity with the second face image of the authentication target acquired by the face image acquisition unit 132 is equal to or larger than the second collation threshold 124, generate an authentication result representing collation failure and transmit the result to the output unit 134. The collation unit 133 is also configured to, when there is at least one reference face image in which the similarity with the second face image of the authentication target acquired by the face image acquisition unit 132 is equal to or larger than the second collation threshold 124, generate an authentication result representing authentication success including the user ID having the maximum similarity, moving type data B, and the authentication time, and transmit the result to the output unit 134 and to the flow rate measurement unit 135. Here, the moving type data B is data indicating the moving direction of the user in which authentication has succeeded, showing a direction from the area E2 to the area E1.

The output unit 134 is configured to transmit the authentication result generated by the collation unit 133 to the gate apparatus 143 via the interface 111. The output unit 134 may transmit the authentication result to an external terminal via the communication interface 114 and/or display it on the screen display unit 116.

The flow rate measurement unit 135 is configured to measure the flow rate X of the users 141 who move from the area E1 to the area E2 via the gate apparatus 143 and the flow rate Y of the users 142 who move from the area E2 to the area E1 via the gate apparatus 143, and store them in the storage unit 120. The flow rate measurement unit 135 measures the flow rate X and the flow rate Y with use of the results of face authentication of the users 141 and 142 by the collation unit 133. Specifically, upon receiving an authentication result of collation success from the collation unit 133, the flow rate measurement unit 135 extracts moving type data and the authentication time from the authentication result. Then, in the case where the extracted moving type data is the moving type data A, the flow rate measurement unit 135 increments the flow rate in the time period including the extracted collation time of the flow rate X stored in the storage unit 120, by one. In the case where the extracted moving type data is the moving type data B, the flow rate measurement unit 135 increments the flow rate in the time period including the extracted collation time of the flow rate Y stored in the storage unit 120, by one.

The flow rate measurement unit 135 is not limited to the example described above. For example, a passage sensor for detecting a user passing through the gate apparatus 143 along with the moving direction may be provided to the gate apparatus 143, and the flow rate measurement unit 135 may be configured to update the flow rate X and the flow rate Y based on a detection signal of the passage sensor. Alternatively, the flow rate measurement unit 135 may be configured to detect persons from images captured by the camera unit 144 and the camera unit 145 and trace the moving directions, detect the user 141 who moves from the area E1 to the area E2 and the user 142 who moves from the area E2 to the area E1, and update the flow rate X and the flow rate Y based on the detection results.

The security level determination unit 136 is configured to read the flow rate data 125 and the security level determination rule 126 from the storage unit 120, and determine the security levels of the area E1 and the area E2 on the basis thereof. Specifically, the security level determination unit 136 determines whether or not the condition section of the security level determination rule 126 is satisfied on the basis of the flow rate data 125, and determines the security levels of the area E1 and the area E2 according to the conclusion section of the security level determination rule 126 in which the condition section is established.

The threshold change unit 137 is configured to change the first collation threshold 123 and the second collation threshold 124 according to the security levels of the area E1 and the area E2 determined by the security level determination unit 136.

Here, when the security level of the area E1 is set to be "low" and the security level of the area E2 is set to be "high", the threshold change unit 137 changes the first collation threshold 123 and the second collation threshold 124 such that the first collation threshold 123 becomes relatively larger than the second collation threshold 124. For example, the threshold change unit 137 changes the first collation threshold 123 to be larger than a predetermined value, and changes the second collation threshold 124 to be smaller than the predetermined value.

When the security level of the area E1 is set to be "high" and the security level of the area E2 is set to be "low", the threshold change unit 137 changes the first collation threshold 123 and the second collation threshold 124 such that the first collation threshold 123 becomes relatively smaller than the second collation threshold 124. For example, the threshold change unit 137 changes the first collation threshold 123 to be smaller than a predetermined value, and changes the second collation threshold 124 to be larger than the predetermined value.

As described above, the threshold change unit 137 changes the first collation threshold 123 in different increasing/decreasing directions between the case where the security level of the area E2 is set to be higher and the case where it is set to be lower than that of the area E1. The threshold change unit 137 also changes the second collation threshold 124 in an increasing/decreasing direction that is opposite to the increasing/decreasing direction of changing the first collation threshold 123.

Figure 4:
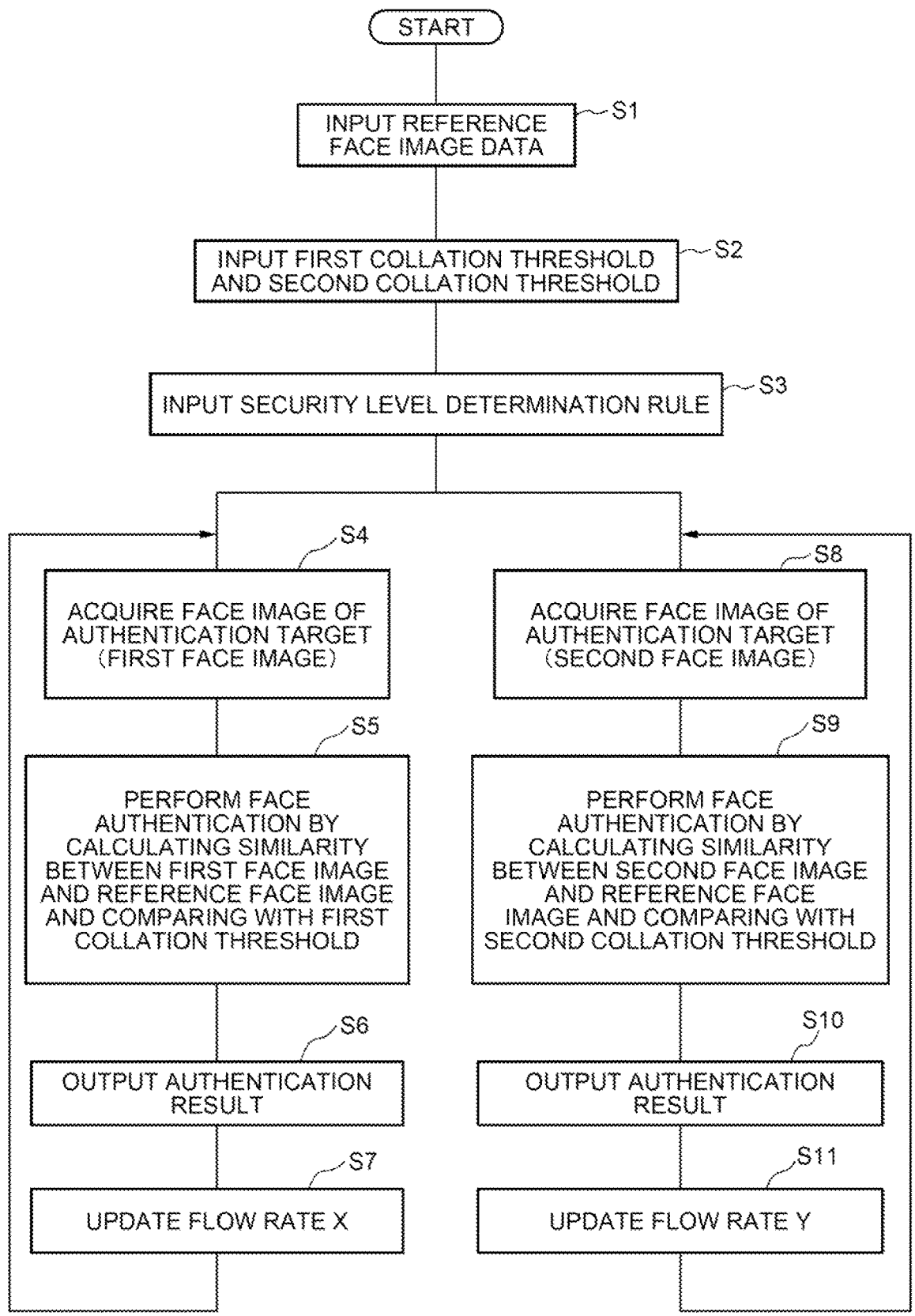
FIG. 4 is a flowchart illustrating an operation of the face authentication apparatus according to the first exemplary embodiment of the present invention.

FIG. 4 is a flowchart illustrating the overall operation of the face authentication apparatus 100. Referring to FIG. 4, first, the input unit 131 of the face authentication apparatus 100 receives the reference face image data 122 input from the outside, and stores it in the storage unit 120 (step S1). Then, the input unit 131 receives the first collation threshold 123 and the second collation threshold 124 input from the outside, and stores them in the storage unit 120 (step S2). The values of the first collation threshold 123 and the second collation threshold 124, input at this time, may be the same or different. They may be small values placing emphasis on convenience, or may be large values placing emphasis on security. Then, the input unit 131 receives the security level determination rule 126 input from the outside, and stores it in the storage unit 120 (step S3). The processes of steps S1 to S3 described above are preparation processes for starting operation of face authentication, and may be omitted if they have been performed once.

Next, the face image acquisition unit 132 of the face authentication apparatus 100 receives image data captured by imaging a face portion of the user 141 moving from the area E1 toward the area E2, from the camera unit 144 via the interface 112, and acquires a face image (first face image) of the authentication target from the image data (step S4). Then, the collation unit 133 of the face authentication apparatus 100 calculates similarity between each reference face image included in the reference face image data 122 and the first face image and compares the similarity with the first collation threshold 123 to thereby perform face authentication, and generates an authentication result showing authentication success or an authentication result showing authentication failure (step S5). Then, the output unit 134 of the face authentication apparatus 100 outputs the authentication result to the gate apparatus 143 via the interface 111 (step S6). Based on the moving type data A and the authentication time included in the authentication result showing authentication success, the flow rate measurement unit 135 of the face authentication apparatus 100 increments the flow rate in the time period including the authentication time of the flow rate X in the flow rate data 125 stored in the storage unit 120, by 1 (step S7). Then, the face authentication apparatus 100 returns to step S4 and repeats the same processes as those described above.

Parallel to the processing of repeatedly performing steps S4 to S7, the face authentication apparatus 100 repeatedly perform the processes of steps S8 to S11 described below. First, the face image acquisition unit 132 of the face authentication apparatus 100 receives image data captured by imaging a face portion of the user 142 moving from the area E2 toward the area E1, from the camera unit 145 via the interface 113, and acquires a face image (second face image) of the authentication target from the image data (step S8). Then, the collation unit 133 of the face authentication apparatus 100 calculates similarity between each reference face image included in the reference face image data 122 and the second face image and compares the similarity with the second collation threshold 124 to thereby perform face authentication, and generates an authentication result showing authentication success or an authentication result showing authentication failure (step S9). Then, the output unit 134 of the face authentication apparatus 100 outputs the authentication result to the gate apparatus 143 via the interface 111 (step S10). Based on the moving type data B and the authentication time included in the authentication result showing authentication success, the flow rate measurement unit 135 of the face authentication apparatus 100 increments the flow rate in the time period including the authentication time of the flow rate Y in the flow rate data 125 stored in the storage unit 120, by 1 (step S11). Then, the face authentication apparatus 100 returns to step S8 and repeats the same processes as those described above.

Figure 5:
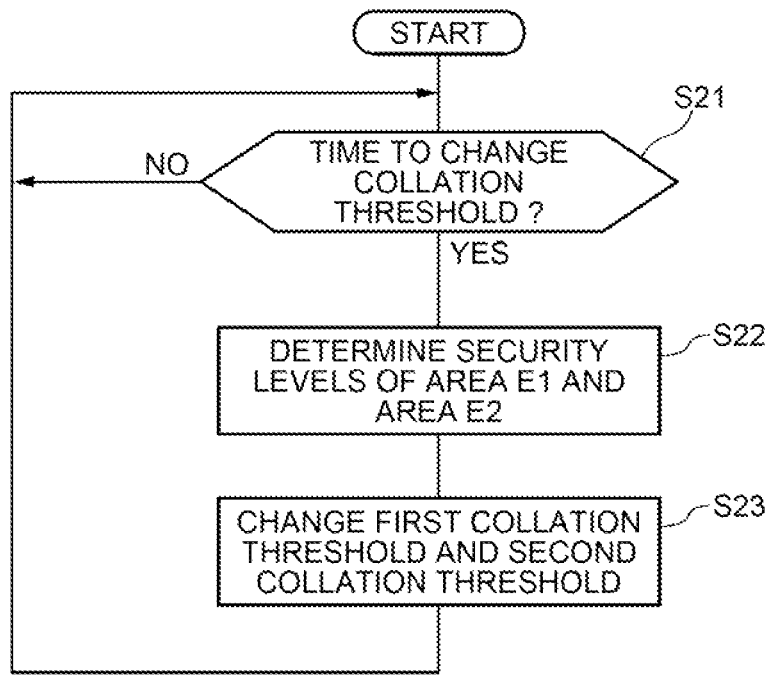
FIG. 5 is a flowchart illustrating an operation of the face authentication apparatus according to the first exemplary embodiment of the present invention.

The face authentication apparatus 100 also performs processing illustrated in FIG. 5 parallel to the processing illustrated in FIG. 4. Referring to FIG. 5, the security level determination unit 136 of the face authentication apparatus 100 determines whether or not the time to change the collation threshold arrives (step S21), and if the changing time does not arrive, the security level determination unit 136 returns to step S21 and repeats the same processes as those described above. Whether or not the time to change the collation threshold arrives can be determined based on whether or not a predetermined date and time arrives, whether or not a certain time (for example, one day or several days) has passed from the operation-started time point or from the previous changing time, whether or not the number of times of collation success reaches a certain number of times after the previous changing time, whether or not the number of times of collation success for a predetermined specific user ID reaches a certain number of times after the previous changing time, or the like.

Next, when the changing time has arrived, the security level determination unit 136 of the face authentication apparatus 100 determines whether or not the condition section of the security level determination rule 126 is satisfied on the basis of the flow rate data 125, and determines the security levels of the area E1 and the area E2 according to the conclusion section of the security level determination rule 126 in which the condition section is satisfied (step S22).

Next, the threshold change unit 137 of the face authentication apparatus 100 changes the first collation threshold 123 and the second collation threshold 124 according to the security levels of the area E1 and the area E2 determined by the security level determination unit 136 (step S23). Then, the face authentication apparatus 100 returns to step S21 and repeats the same processes as those described above. It is also possible to have a configuration in which the processing illustrated in FIG. 5 ends after step S23. With such a configuration, once the first collation threshold and the second collation threshold are set according to the flow rate, the setting is kept unchanged until being initialized.

As described above, according to the face authentication apparatus 100 of the present embodiment, it is possible to determine the security levels of both sides of the gate apparatus 143 and automatically change the first collation threshold and the second collation threshold accordingly. Therefore, a burden on the administrator can be reduced significantly.

Figure 6:
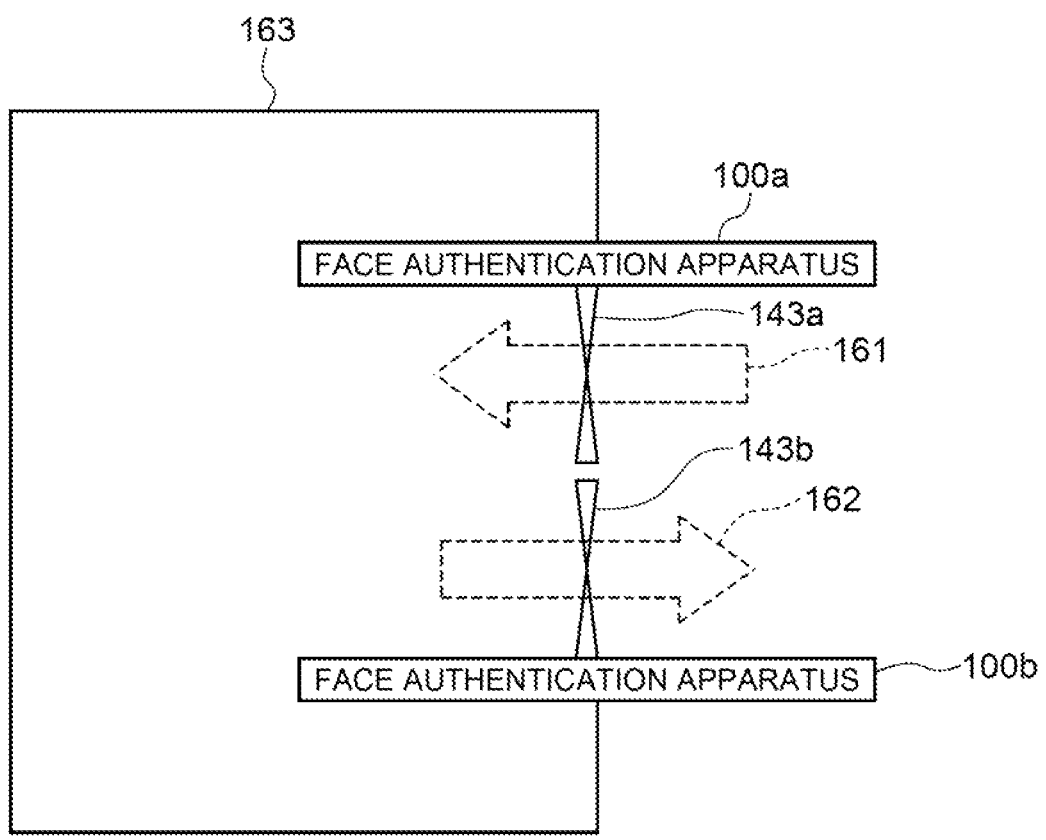
FIG. 6 illustrates an exemplary application of the face authentication apparatus according to the first exemplary embodiment of the present invention.

For example, as illustrated in FIG. 6, it is assumed that a gate apparatus 143a for entry and a gate apparatus 143b for exit are temporarily provided at the entrance of an office building 163 or the like. At the time when they are temporarily provided, first and second collation thresholds for a face authentication apparatus 100a that performs face authentication on users passing through the gate apparatus 143a and a face authentication apparatus 100b that performs face authentication on users passing through the gate apparatus 143b have the same value. Thereafter, when operation is started and a large number of users pass through the gate apparatus 143a in a direction of an arrow 161 in FIG. 6 in a time period from 6:00 to 9:00 for example, face authentication is performed accordingly and the flow rate thereof is measured. Further, when a large number of users pass through the gate apparatus 143b in a direction of an arrow 162 in FIG. 6 in a time period from 17:00 to 20:00 for example, face authentication is performed accordingly and the flow rate thereof is measured. Then, at 0:00 on the next day for example, security levels of both sides of the gate are determined, and the collation thresholds are changed accordingly in the face authentication apparatuses 100a and 100b. At that time, in the face authentication apparatus 100a, the security level determination rule 126a illustrated in FIG. 3 is applied. As a result, the security level on the downstream side (that is, inside the building) of the flow rate of the users moving in the direction of the arrow 161 is determined to be "high", and the security level on the upstream side (that is, outside the building) is determined to be "low". Therefore, the threshold for face authentication of uses passing in the direction of the arrow 161 is adjusted in a direction to be increased, that is, adjusted in a direction of lowering the false acceptance rate to place emphasis on security. Further, in the face authentication apparatus 100b, the security level determination rule 126b illustrated in FIG. 3 is applied. As a result, the security level on the upstream side (that is, inside the building) of the flow rate of the users moving in the direction of the arrow 162 is determined to be "high", and the security level on the downstream side (that is, outside the building) is determined to be "low". Therefore, the threshold for face authentication of uses passing in the direction of the arrow 162 is adjusted in a direction to be decreased, that is, adjusted in a direction of lowering the false rejection rate to place emphasis on convenience.

In the example of FIG. 6, the gate apparatus 143a is used as an entry gate and the gate apparatus 143b is used as an exit gate. However, even in the case where each of the gate apparatuses 143a and 143 b is used as an entry/exit gate, the same advantageous effects can be achieved. Moreover, in the example of FIG. 6, the reference numeral 163 denotes an office building or the like. However, it may be not a building but a space where an event is held.

Second Exemplary Embodiment

Figure 7:
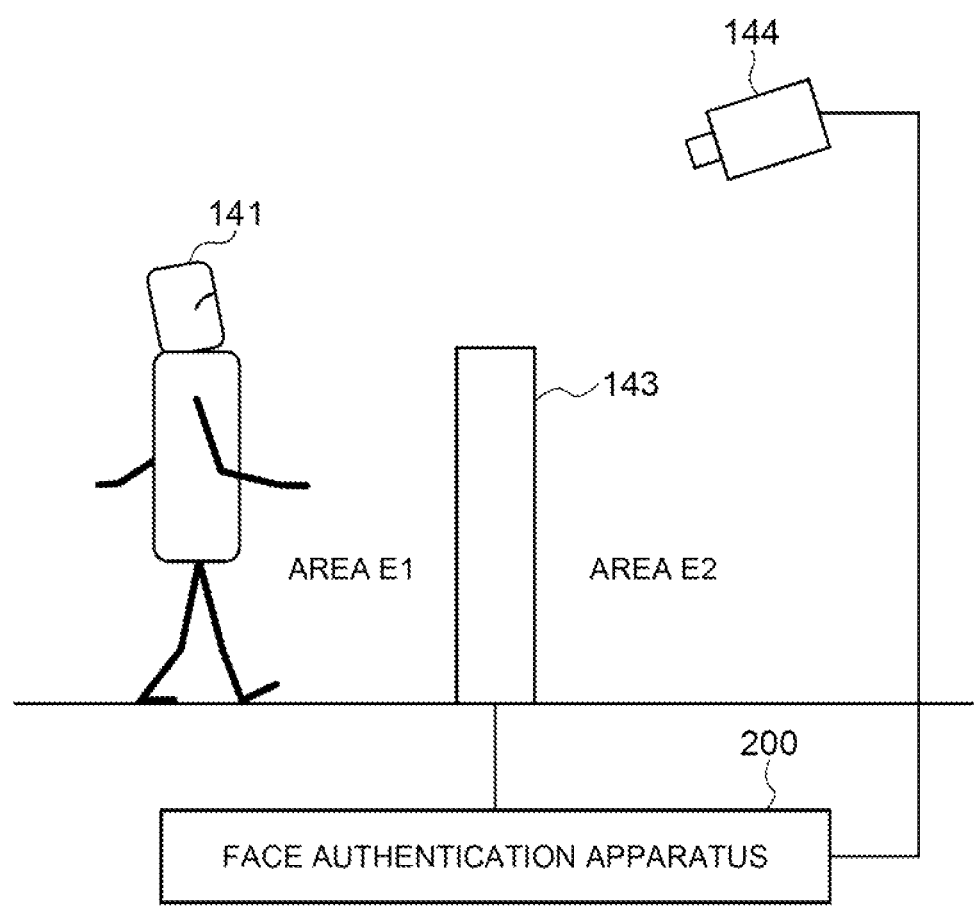
FIG. 7 illustrates the outline of a face authentication apparatus according to a second exemplary embodiment of the present invention.

FIG. 7 illustrates the outline of a face authentication apparatus 200 according to a second exemplary embodiment of the present invention. Referring to FIG. 7, the face authentication apparatus 200 is configured to perform face authentication on the user 141 who passes through the gate apparatus 143, provided between the area E1 and the area E2, form the area E1 to the area F2, and transmit the authentication result to the gate apparatus 143.

The face authentication apparatus 200 of the present embodiment differs from the face authentication apparatus 100 illustrated in FIG. 1 in that face authentication is not performed on a user passing through the gate apparatus 143 from the area E2 to the area E1. The other aspects are the same as those of the face authentication apparatus 100 illustrated in FIG. 1. Note that in the face authentication apparatus 200, the flow rate of users passing through the gate apparatus 143 from the area E2 to the area E1 is measured by a passage sensor or the like, not illustrated, provided to the gate apparatus 143.

According to the face authentication apparatus 100 of the present embodiment, it is possible to determine the security levels of both sides of the gate apparatus 143 and automatically change the first collation threshold 123 accordingly. Therefore, a burden on the administrator can be reduced significantly.

In the case of using the face authentication apparatus 100 of the present embodiment as the face authentication apparatus 100a of the gate apparatus 143a in FIG. 6 for example, the gate apparatus 143a is temporarily provided to have an orientation in which the area E1 of FIG. 7 is outside the building and the area E2 is inside the building. Similarly, in the case of using the face authentication apparatus 100 of the present embodiment as the face authentication apparatus 100b of the gate apparatus 143b in FIG. 6 for example, the gate apparatus 143b is temporarily provided to have an orientation in which the area E1 of FIG. 7 is inside the building and the area E2 is outside the building. With such setting, when operation is started and a large number of users pass through the gate apparatus 143a in the direction of the arrow 161 in FIG. 6 in a time period from 6:00 to 9:00 for example and a large number of users passes through the gate apparatus 143b in the direction of the arrow 162 in FIG. 6 in a time period from 17:00 to 20:00 for example, face collation is performed accordingly, and the flow rate thereof is measured. Then, at 0:00 on the next day for example, the security levels of both sides of the gate are determined and the collation thresholds are changed accordingly in the face authentication apparatuses 100a and 100b. At that time, in the face authentication apparatus 100a, the security level determination rule 126a illustrated in FIG. 3 is applied. As a result, the security level on the downstream side (that is, inside the building) of the flow rate of the users moving in the direction of the arrow 161 is determined to be "high", and the security level on the upstream side (that is, outside the building) is determined to be "low". Therefore, the threshold for face authentication of uses passing in the direction of the arrow 161 is adjusted in a direction to be increased, that is, adjusted in a direction of lowering the false acceptance rate to place emphasis on security. Further, in the face authentication apparatus 100b, the security level determination rule 126b illustrated in FIG. 3 is applied. As a result, the security level on the upstream side (that is, inside the building) of the flow rate of the users moving in the direction of the arrow 162 is determined to be "high", and the security level on the downstream side (that is, outside the building) is determined to be "low". Therefore, the threshold for face authentication of uses passing in the direction of the arrow 162 is adjusted in a direction to be decreased, that is, adjusted in a direction of lowering the false rejection rate to place emphasis on convenience.

Third Exemplary Embodiment

Figure 8:
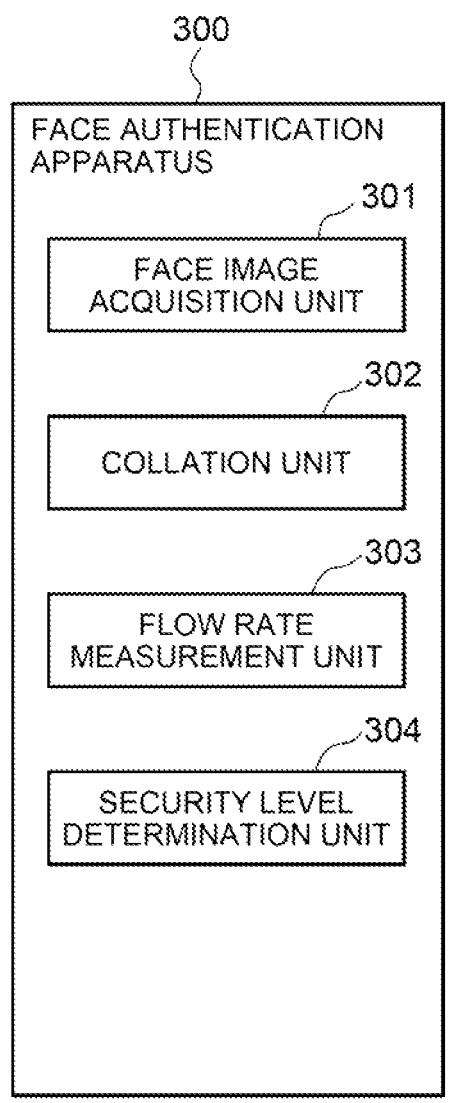
FIG. 8 is a block diagram of a face authentication apparatus according to a third exemplary embodiment of the present invention.

FIG. 8 is a block diagram of a face authentication apparatus 300 according to a third exemplary embodiment of the present invention. Referring to FIG. 8, the face authentication apparatus 300 includes a face image acquisition unit 301, a collation unit 302, a flow rate measurement unit 303, and a security level determination unit 304.

The face image acquisition unit 301 is configured to acquire, as a first face image, a face image of a user who moves from a first area to a second area via a gate (not illustrated) provided between the first area and the second area. The face image acquisition unit 301 can have a configuration similar to that of the face image acquisition unit 132 of FIG. 2, but it is not limited thereto.

The collation unit 302 is configured to perform face authentication on the first face image acquired by the face image acquisition unit 301. The collation unit 302 may have a configuration similar to that of the collation unit 133 of FIG. 2, but it is not limited thereto.

The flow rate measurement unit 303 is configured to measure the flow rate of users who move from the first area to the second area via the gate and the flow rate of users who move from the second area to the first area via the gate. The flow rate measurement unit 303 may have a configuration similar to that of the flow rate measurement unit 135 of FIG. 2, but it is not limited thereto.

The security level determination unit 304 is configured to determine security levels of the first area and the second area, based on the flow rates measured by the flow rate measurement unit 303. The security level determination unit 304 can have a configuration similar to that of the security level determination unit 136 of FIG. 2, but it is not limited thereto.

The face authentication apparatus 300 configured as described above operates as described below. First, the face image acquisition unit 301 acquires, as a first face image, a face image of a user who moves from a first area to a second area via a gate (not illustrated) provided between the first area and the second area. Then, the collation unit 302 performs face authentication on the first face image acquired by the face image acquisition unit 301. Then, the flow rate measurement unit 303 measures the flow rate of users who move from the first area to the second area via the gate and the flow rate of users who move from the second area to the first area via the gate. Then, the security level determination unit 304 determines security levels of the first area and the second area, based on the flow rates measured by the flow rate measurement unit 303.

According to the face authentication apparatus 100 of the present embodiment, a burden on the administrator can be reduced significantly. This is because the flow rates of users passing through a gate are measured and the security levels of both side of the gate are determined based on the measured flow rates, whereby the administrator is not necessary to determine the security levels of both sides of the gate.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to an access monitoring system, an attendance management system, and the like, and in particular, suitable for the case of improving convenience and security by automatically correct thresholds to be used for collation appropriately, without placing a burden on the administrator.

The whole or part of the exemplary embodiments disclosed above can be described as, but not limited to, the following supplementary notes.

(Supplementary Note 1)
A face authentication apparatus comprising:
a face image acquisition unit that acquires, as a first face image, a face image of a user who moves from a first area to a second area via a gate provided between the first area and the second area;
a collation unit that performs face authentication on the first face image;
a flow rate measurement unit that measures a flow rate of users who move from the first area to the second area via the gate and a flow rate of users who move from the second area to the first area via the gate; and
a security level determination unit that determines a security level of the first area and a security level of the second area on a basis of the flow rates measured.

(Supplementary Note 2)
The face authentication apparatus according to supplementary note 1, wherein
the collation unit performs the face authentication on the first face image on a basis of a first threshold, and
the face authentication apparatus further comprises a threshold change unit that changes the first threshold according to the determined security level of the first area and the determined security level of the second area.

(Supplementary Note 3)
The face authentication apparatus according to supplementary note 2, wherein
the security level determination unit determines the security level of the first area and the security level of the second area on a basis of the measured flow rates and a security level determination rule set in advance.

(Supplementary Note 4)
The face authentication apparatus according to supplementary note 3, wherein
the security level determination rule includes a condition section that describes a condition to be satisfied by the measured flow rates, and a conclusion section that describes a security level of the first area and a security level of the second area when the condition is satisfied.

(Supplementary Note 5)
The face authentication apparatus according to supplementary note 4, wherein
the condition section describes as the condition that there is a difference between a flow rate of users who moved from the first area to the second area and a flow rate of users who moved from the second area to the first area in a designated time period, and the conclusion section describes on which of a downstream side and an upstream side of a larger flow rate in the designated time period, the security level is set to be higher.

(Supplementary Note 6)
The face authentication apparatus according to any of supplementary notes 2 to 5, wherein
the threshold change unit changes the first threshold in a different increasing or decreasing direction between a case in which the security level of the second area is determined to be higher than the security level of the first area and a case in which the security level of the second area is determined to be lower than the security level of the first area.

(Supplementary Note 7)
The face authentication apparatus according to any of supplementary notes 2 to 6, wherein
the threshold change unit changes the first threshold to be larger than a predetermined value when the security level of the second area is determined to be higher than the security level of the first area, and changes the first threshold to be smaller than the predetermined value when the security level of the second area is determined to be lower than the security level of the first area.

(Supplementary Note 8)
The face authentication apparatus according to any of supplementary notes 2 to 7, wherein
the face image acquisition unit further acquires, as a second face image, a face image of a user who moves from the second area to the first area via the gate,
the collation unit further performs face authentication on the second face image by calculating similarity between the second face image and a reference face image for each registered user and comparing the similarity with a second threshold, and
the threshold change unit changes the second threshold in an increasing or decreasing direction that is opposite to the increasing or decreasing direction of changing the first threshold.

(Supplementary Note 9)
The face authentication apparatus according to any of supplementary notes 2 to 8, wherein
the flow rate measurement unit measures the flow rate of the users who move from the first area to the second area via the gate by counting a number of times that the face authentication performed by the collation unit on the first face images succeeded.

(Supplementary Note 10)
The face authentication apparatus according to any of supplementary notes 2 to 9, wherein
in the face authentication, similarly between the first face image and the reference face image is calculated by collating a feature amount of a face extracted from the first face image with a feature amount of a face extracted from a reference face image of each registered user.

(Supplementary Note 11)
A face authentication method comprising:
acquiring, as a first face image, a face image of a user who moves from a first area to a second area via a gate provided between the first area and the second area;
performing face authentication on the first face image;
measuring a flow rate of users who move from the first area to the second area via the gate and a flow rate of users who move from the second area to the first area via the gate; and
determining a security level of the first area and a security level of the second area on a basis of the flow rates measured.

(Supplementary Note 12)
The face authentication method according to supplementary note 11, wherein
the performing the face authentication includes performing the face authentication on the first face image on a basis of a first threshold, and
the method further comprises changing the first threshold according to the determined security level of the first area and the determined security level of the second area.

(Supplementary Note 13)
The face authentication method according to supplementary note 12, wherein
the determining the security level includes determining the security level of the first area and the security level of the second area on a basis of the measured flow rates and a security level determination rule set in advance.

(Supplementary Note 14)
The face authentication method according to supplementary note 13, wherein
the security level determination rule includes a condition section that describes a condition to be satisfied by the measured flow rates, and a conclusion section that describes a security level of the first area and a security level of the second area when the condition is satisfied.

(Supplementary Note 15)
The face authentication method according to supplementary note 14, wherein
the condition section describes as the condition that there is a difference between a flow rate of users who moved from the first area to the second area and a flow rate of users who moved from the second area to the first area in a designated time period, and the conclusion section describes on which of a downstream side and an upstream side of a larger flow rate in the designated time period, the security level is set to be higher.

(Supplementary Note 16)
The face authentication method according to any of supplementary notes 12 to 15, wherein
the changing the first threshold includes changing the first threshold in a different increasing or decreasing direction between a case in which the security level of the second area is determined to be higher than the security level of the first area and a case in which the security level of the second area is determined to be lower than the security level of the first area.

(Supplementary Note 17)
The face authentication method according to any of supplementary notes 12 to 16, wherein
the changing the first threshold includes changing the first threshold to be larger than a predetermined value when the security level of the second area is determined to be higher than the security level of the first area, and changing the first threshold to be smaller than the predetermined value when the security level of the second area is determined to be lower than the security level of the first area.

(Supplementary Note 18)
The face authentication method according to any of supplementary notes 12 to 17, further comprising:
acquiring, as a second face image, a face image of a user who moves from the second area to the first area via the gate;
performing face authentication on the second face image by calculating similarity between the second face image and a reference face image for each registered user and comparing the similarity with a second threshold; and
changing the second threshold in an increasing or decreasing direction that is opposite to the increasing or decreasing direction of changing the first threshold.

(Supplementary Note 19)
The face authentication method according to any of supplementary notes 12 to 18, wherein
the measuring the flow rate includes measuring the flow rate of the users who move from the first area to the second area via the gate by counting a number of times that the face authentication performed on the first face images succeeded.

(Supplementary Note 20)
The face authentication method according to any of supplementary notes 12 to 19, wherein
in the face authentication, similarly between the first face image and the reference face image is calculated by collating a feature amount of a face extracted from the first face image with a feature amount of a face extracted from a reference face image of each registered user.

(Supplementary Note 21)

A computer-readable medium storing a program for causing a computer to function as:
- a face image acquisition unit that acquires, as a first face image, a face image of a user who moves from a first area to a second area via a gate provided between the first area and the second area;
- a collation unit that performs face authentication on the first face image;
- a flow rate measurement unit that measures a flow rate of users who move from the first area to the second area via the gate and a flow rate of users who move from the second area to the first area via the gate; and
- a security level determination unit that determines a security level of the first area and a security level of the second area on a basis of the flow rates measured.

REFERENCE SIGNS LIST 100 face authentication apparatus
100a face authentication apparatus
100b face authentication apparatus
111 interface
112 interface
113 interface
114 communication interface
115 operation input unit
116 screen display unit
120 storage unit
121 program
122 reference face image data
123 first collation threshold
124 second collation threshold
125 flow rate data
126 security level determination rule
126a security level determination rule
126b security level determination rule
130 arithmetic processing unit
131 input unit
132 face image acquisition unit
133 collation unit
134 output unit
135 flow rate measurement unit
136 security level determination unit
137 threshold change unit
141 user
142 user
143 gate apparatus
143a gate apparatus
143b gate apparatus
161 arrow indicating passage direction of user
162 arrow indicating passage direction of user
163 building
200 face authentication apparatus
300 face authentication apparatus
301 face image acquisition unit
302 collation unit
303 flow rate measurement unit
304 security level determination unit
305 threshold change unit

The invention claimed is:

1. A face authentication apparatus comprising:
a memory containing program instructions; and
a processor coupled to the memory, wherein the processor is configured to execute the program instructions to:
   acquire, as a first face image, a face image of a person moving from a first area to a second area via a gate provided between the first area and the second area, and acquire, as a second face image, a face image of a person moving from the second area to the first area via the gate;
   perform first face authentication based on the first face image;
   perform second face authentication based on the second face image; and
   determine a security level based on at least one of a number of times of success in the first face authentication and a number of times of success in the second face authentication,
wherein the determination of the security level includes determining a first security level of the first area and a second security level of the second area according to a security level determination rule set in advance, based on the measured number of times of success in the first face authentication and the measured number of times of success in the second face authentication,
wherein the security level determination rule comprises:
   a condition section that indicates a condition to be satisfied by the measured number of times of success in the first face authentication or the measured number of times of success in the second face authentication, and
   a conclusion section that indicates the first security level of the first area and the second security level of the second area when the condition is satisfied,
wherein the condition section indicates as the condition that there is a difference between a first rate of persons moving in a downstream side from the first area to the second area and a second rate of persons moving in an upstream side from the second area to the first area, and
wherein the conclusion section indicates that the security level is set to be higher on one of the downstream side and the upstream side having a larger flow rate in a designated time.

2. The face authentication apparatus according to claim 1, wherein
the determination of the security level is changed when a predetermined date and time arrives.

3. The face authentication apparatus according to claim 1, wherein
the determination of the security level is changed when at least one of the number of times of success in the first face authentication and the number of times of success in the second face authentication reaches a certain number of times.

4. The face authentication apparatus according to claim 1, wherein
the first face authentication is performed on the first face image based on a first threshold,
the second face authentication is performed on the second face image based on a second threshold, and
the processor is configured to further execute the program instructions to change the first threshold and the second threshold according to the first security level of the first area and the second security level of the second area.

5. The face authentication apparatus according to claim 4, wherein
the change of the first threshold includes changing the first threshold when the security level of the second area is determined to be higher than the security level of the first area and when the security level of the second area is determined to be lower than the security level of the first area.

6. The face authentication apparatus according to claim 4, wherein
the change of the first threshold include changing the first threshold to be larger than a predetermined value when the security level of the second area is determined to be higher than the security level of the first area, and changing the first threshold to be smaller than the predetermined value when the security level of the second area is determined to lower than the security level of the first area.

7. The face authentication apparatus according to claim 4, wherein
the second face authentication is further performed on the second face image by calculating similarity between the second face image and a reference face image for each registered person and comparing the similarity with the second threshold, and
the second threshold is changed in an increasing or decreasing direction that is opposite to the increasing or decreasing direction of changing the first threshold.

8. The face authentication apparatus according to claim 4, wherein
the first face authentication is further performed on the first face image by calculating similarity between the first face image and a reference face image for each registered person and comparing the similarity with the first threshold, and
the first threshold is changed in an increasing or decreasing direction that is opposite to the increasing or decreasing direction of changing the second threshold.

* * * * *